United States Patent
Yang et al.

(10) Patent No.: US 12,284,226 B2
(45) Date of Patent: *Apr. 22, 2025

(54) METHODS AND DEVICES FOR ESTABLISHING SECURE COMMUNICATION CHANNELS

(71) Applicant: MALIKIE INNOVATIONS LIMITED, Dublin (IE)

(72) Inventors: Chang Fung Yang, Mississauga (CA); Jason Songbo Xu, Toronto (CA)

(73) Assignee: Malikie Innovations Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/350,954

(22) Filed: Jul. 12, 2023

(65) Prior Publication Data
US 2024/0015186 A1    Jan. 11, 2024

Related U.S. Application Data

(63) Continuation of application No. 17/501,068, filed on Oct. 14, 2021, now Pat. No. 11,743,300, which is a
(Continued)

(51) Int. Cl.
*H04L 9/40*    (2022.01)
*H04L 9/06*    (2006.01)
*H04L 9/32*    (2006.01)

(52) U.S. Cl.
CPC .......... *H04L 63/205* (2013.01); *H04L 9/0631* (2013.01); *H04L 9/0637* (2013.01); *H04L 9/0643* (2013.01); *H04L 9/3242* (2013.01)

(58) Field of Classification Search
CPC .... H04L 63/205; H04L 9/0631; H04L 9/0637
(Continued)

(56) References Cited

U.S. PATENT DOCUMENTS 7,219,223 B1    5/2007    Bacchus et al.
2011/0078436 A1    3/2011    Sato
(Continued)

FOREIGN PATENT DOCUMENTS

EP    2007110 A1    12/2008

OTHER PUBLICATIONS

Extended European Search Report issued in corresponding EP application No. 23188392.7 on Sep. 25, 2023.
(Continued)

*Primary Examiner* — Anthony D Brown
(74) *Attorney, Agent, or Firm* — Botos Churchill IP Law LLP

(57) ABSTRACT

A method of establishing a secure communication channel between a first communication device and a second communication device. The secure communication channel is defined by one or more algorithm options and the one or more algorithm options are associated with one of one or more option categories. The method includes receiving a signal representing one or more selections. The method further includes, for the respective option categories, generating a sorted list of algorithm options based on the received selections and generating a security association proposal including one or more of the algorithm options from the respective sorted lists of algorithm options. The security association proposal is generated based on an order in the sorted list of algorithm options. The method further includes transmitting the security association proposal to the second communication device for establishing the secure communication channel.

20 Claims, 5 Drawing Sheets

Related U.S. Application Data continuation of application No. 16/181,755, filed on Nov. 6, 2018, now Pat. No. 11,178,190.

(58) Field of Classification Search
USPC .......................................................... 713/168
See application file for complete search history.

(56) References Cited

U.S. PATENT DOCUMENTS

| 2013/0254531 A1* | 9/2013 | Liang | H04L 63/164 |
| | | | 713/151 |
| 2018/0004363 A1 | 1/2018 | Tompkins | |

OTHER PUBLICATIONS

Office Action for Canadian Patent Application No. 3,060,278, Oct. 12, 2023, 5 Pages.
Kaufman et al.: Internet Key Exchange Protocol Version 2 (IKEv2), Request for Comments: 7296, Internet Engineering Task Force, 142 pages, dated Oct. 2014.
Milutinovic et al.: "Secure Negotiation for Manual Authentication Protocols", dated Oct. 19, 2007.
EPO: Extended European Search Report relating to EP application No. 19206500.1, dated Jan. 23, 2020.
EPO: EP Office Action relating to EP application No. 19206500.1, dated Jan. 19, 2022.
USPTO, Office Action relating to U.S. Appl. No. 17/501,068 dated Jan. 20, 2023.

* cited by examiner

METHODS AND DEVICES FOR ESTABLISHING SECURE COMMUNICATION CHANNELS

CROSS REFERENCE TO RELATED APPLICATIONS

The present application a continuation of U.S. patent application Ser. No. 17/501,068 entitled "METHODS AND DEVICES FOR ESTABLISHING SECURE COMMUNICATION CHANNELS", filed Oct. 14, 2021, which is a continuation of U.S. patent application Ser. No. 16/181,755, filed Nov. 6, 2018, which issued as U.S. Pat. No. 11,178,190, the contents of which are incorporated herein by reference in their entirety.

FIELD

The present application generally relates to network communications and, in particular, methods and systems of establishing a secure communication channel among communication devices.

BACKGROUND

A communication device can communicate with another communication device over a network via a secure communication channel. The respective communication devices can negotiate what algorithms to use for preparing data for transmission over the secure communication channel. For example, negotiated algorithm options can include encryption or integrity algorithms for use when preparing data for exchange over the secure communication channel. The communication devices can also negotiate the security strength of encryption keys or the pseudorandom function to be used when preparing data. The negotiation is often performed prior to exchange of data and if a set of algorithm options supported by one communication device does not match a set of algorithm options supported by another communication device, secure communication between those communication devices may not be possible.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
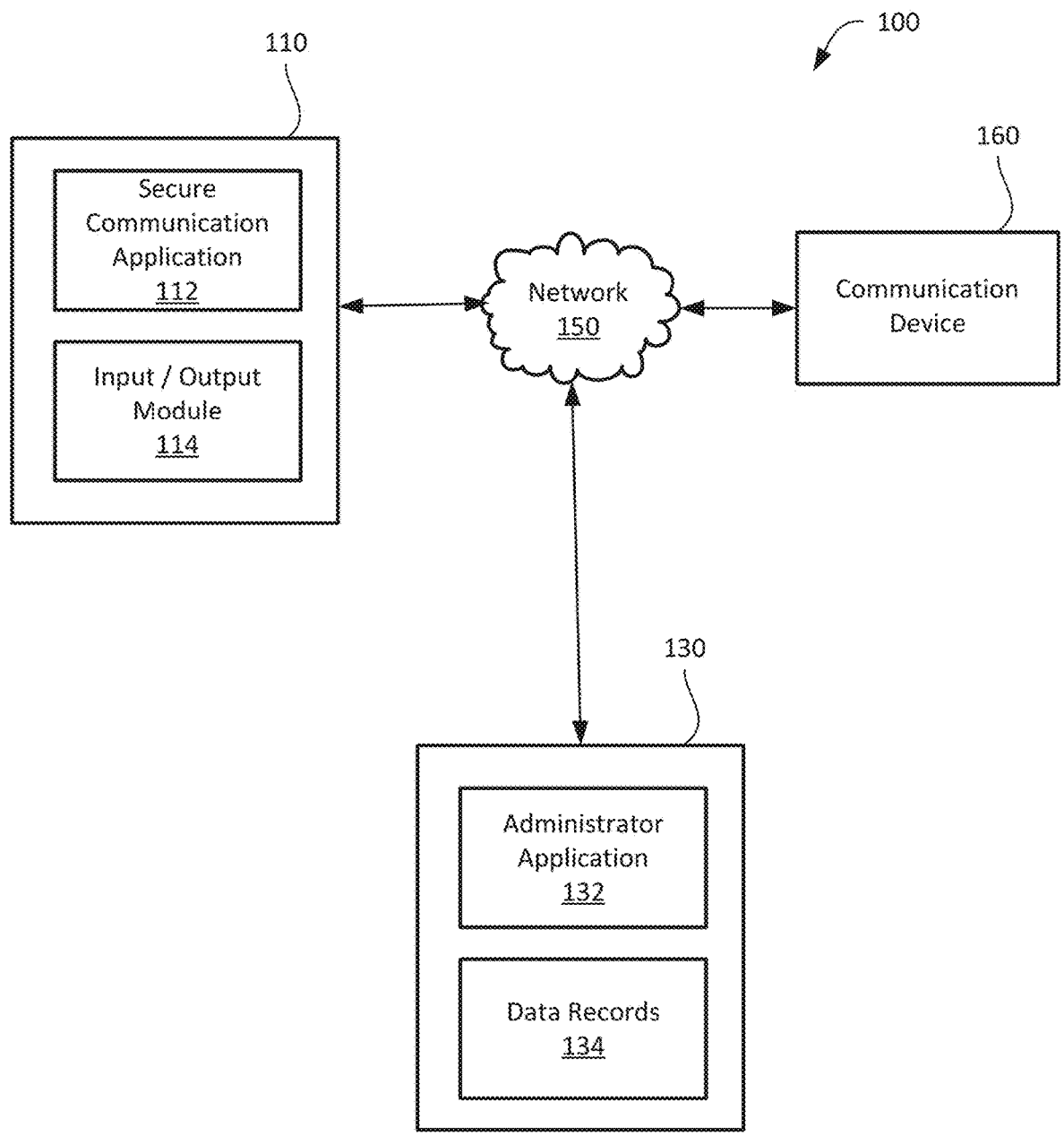
FIG. 1 illustrates, in block diagram form, a system for establishing a secure communication channel between an originating communication device and a target communication device, in accordance with an example of the present application.

In a first aspect, the present application describes a method of establishing a secure communication channel between a first communication device and a second communication device. The secure communication channel is defined by one or more algorithm options. The one or more algorithm options are associated with one of one or more option categories. The method includes: receiving, via an input module, a signal representing one or more selections, the respective one or more selections being associated with one of the one or more option categories; for the respective option categories, generating a sorted list of algorithm options based on the received selections; generating a security association proposal including one or more of the algorithm options from the respective sorted lists of algorithm options, wherein the security association proposal is generated based on an order in the sorted list of algorithm options; and transmitting the security association proposal to the second communication device for establishing the secure communication channel.

In another aspect, the present application describes a computing device comprising: a communications module; an input module; a display; a processor coupled to the communications module, the display, and the input module; and a memory coupled to the processor. The memory stores processor-executable instructions for establishing a secure communication channel between the computing device and a second communication device. The secure communication channel is defined by one or more algorithm options and the one or more algorithm options are associated with one of one or more option categories. The processor-executable instructions, when executed, configure the processor to: receive, via the input module, a signal representing one or more selections, the respective one or more selections being associated with one of the one or more option categories; for the respective option categories, generate a sorted list of algorithm options based on the received selections; generate a security association proposal including one or more of the algorithm options from the respective sorted lists of algorithm options, wherein the security association proposal is generated based on an order in the sorted list of algorithm options; and transmit the security association proposal to the second communication device for establishing the secure communication channel.

In yet a further aspect, the present application describes non-transitory computer-readable storage medium storing processor-readable instructions that, when executed, configure a processor to perform one or more of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Secure communication technology enables an originating communication device to securely transmit data to a target communication device, and vice versa, by preparing and transmitting data using algorithms that are supported by the respective communication devices. Prior to data exchange, the originating communication device negotiates with the target communication device the algorithm options that are to be used. In some examples, algorithm options can include, for example, Diffie-Hellman groups (DH groups), encryption algorithms, integrity algorithms, or pseudorandom function algorithms.

In some examples, Internet Key Exchange (IKE)/Internet Protocol Security (IPSec) protocols can utilize DH groups, such as Internet Key Exchange Version 2 (IKEv2) groups. Example IKEv2 groups can be defined by the Internet Assigned Numbers Authority (IANA) (see e.g., https://www.iana.org/assignments/ikev2-parameters/ikev2-parameters.xhtml#ikev2-parameters-8). For ease of exposition, in some examples described herein, DH group settings can include group numbers 20, 19, 15, 1, or none. It can be appreciated that some protocols may not utilize DH groups or the like as an algorithm options, and in these other protocols, DH groups are not selectable algorithm options.

An encryption algorithm can define the algorithm type to be used for encrypting data for transmission across a communication channel. Example encryption algorithms can include Advanced Encryption Standard Galois/Counter Mode algorithms (AES-GCM), such as AES-GCM-256 or AES-GCM-128, Advanced Encryption Standard Cipher Blocker Chaining algorithms (AES-CBC), such as AES-CBC-256 or AES-CBC-128, Chacha20, or no encryption. An integrity algorithm can define the algorithm type to be used for verifying that data transmitted across the communication channel has not been manipulated or compromised. Example integrity algorithms can include Hash-based Message Authentication Code Secure Hash Algorithms (HMAC-SHA), such as HMAC-SHA-512-256, HMAC-SHA-384-192, HMAC-SHA-256-128, HMAC-SHA-1-96, AES-GCM algorithms, such as AES-GCM-128 or AES-GCM-256, or Poly1305 algorithms. In some examples, the ChaCha20 encryption algorithm and the Poly1305 integrity algorithm can be used together (e.g., a ChaCha20-Poly1305 "combined" mode). The ChaCha20-Poly1305 algorithm option combination is described, for example, by the Internet Research Task Force (IRTF) (see e.g., https://tools.ietf.org/html/rfc7539).

A pseudorandom function is a computable function for providing an output in response to a received input. Example pseudorandom functions can include HMAC-SHA-512, HMAC-SHA-384, HMAC-SHA-256, or HMAC-SHA-1. The DH Groups, encryption algorithms, integrity algorithms, and pseudorandom functions are example option categories. Although four different option categories are described, other option categories are contemplated for defining algorithm options relevant for establishing a secure communication channel among communication devices. Further, for some protocols for establishing a secure communication channel, one or more of the algorithm option categories may not be relevant.

As described, prior to secure data exchange between communication devices, the respective communication devices can negotiate the algorithm options to be used for preparing data for transmission over the secure communication channel. Prior to the negotiation process, an originating communication device can determine the combination of algorithm options to be proposed to a target communication device. In some implementations, algorithm proposals may be a pre-selected set. For example, in the Transport Layer Security (TLS) protocol, a pre-selected set of algorithm options/settings are encoded with identifiers. For instance, a ciphersuite identified as TLS_ECDHE_ECDSA_WITH_AES_256_GCM_SHA384 may be associated with a pre-selected set of settings (e.g., elliptic curve diffie-hellman (ECDHE) key exchange, elliptic curve digital signature algorithm (ECDSA), AES-256-GCM encryption, and SHA384 authentication). In the present example implementation, if the target communication device cannot support at least one of the pre-selected algorithm options, the entire algorithm proposal will be deemed unusable. As there may be no way to separate the individual settings from the algorithm proposal, the target communication device can only evaluate respective algorithm proposals as a discrete pre-selected set of algorithm options rather than being able to pick-and-choose individual algorithm settings.

In some other implementations, the originating communication device can identify one or more algorithm options from each respective option category. For example, the originating communication device can be configured to identify one or more supported DH group numbers or can be configured to support a particular encryption algorithm (e.g., Authenticated Encryption with Associated Data (AEAD) to the exclusion of another encryption algorithm (e.g., non-AEAD)).

The identified algorithm options can be determined based on what the communication device can support. For example, a communication device having low computational capacity or ability may be unable to support 256-bit keys but may be able to support 128-bit keys. In another example, identified algorithm options can be based on what an administrator device requires of the originating communication device. For example, the originating communication device may be managed by the administrator device and the administrator device may require that the originating communication device utilize, for example, Authenticated Encryption with Associated Data (AEAD) algorithms when generating security keys or preparing data. Further, identified algorithm options can be based on what is proposed by a user of the originating communication device. For example, a user may desire that keys having a particular security strength be used for transforming data for transmission over a communication channel, while other communication device users may be content with keys having any security strength so as to accommodate establishing secure communication channels with a greater number of potential target communication devices. Thus, the originating communication device may identify a subset of algorithm options in each of the respective option categories and, subsequently, generate a list of all potential combinations of algorithm options, where an algorithm option is chosen from each of the respective option categories.

In some implementations, the originating communication device can generate, based on user selections of algorithm options, a list of discrete proposals for each combination of algorithm options. For example, a user of the originating communication device can select:
 DH group: 15
 Encryption Algorithms: AES-CBC-256
 Integrity Algorithms: HMAC-SHA-512-256, HMAC0SHA-384-192, HMAC-SHA-256-128, HMAC0SHA-1-96

Continuing with the aforementioned example implementation, the originating communication device can, subsequently, generate four discrete proposals:

*DH*15+*AES-CBC*-256+*HMAC-SHA*-512-256

*DH*15+*AES-CBC*-256+*HMAC-SHA*-384-192

*DH*15+*AES-CBC*-256+*HMAC-SHA*-256-128

*DH*15+*AES-CBC*-256+*HMAC-SHA*-1-96

The originating communication device can subsequently transmit the generated list of discrete proposals to the target communication device. The target communication device may proceed to evaluate, one-by-one and beginning at the start of the list, the list of potential discrete combinations until such time that the target communication device is able to support a particular evaluated proposal. In the aforementioned example implementation, the target communication device may accept a combination of algorithm options as soon as an acceptable proposal is identified. However, the acceptance by the target communication device of a discrete proposal may be without regard as to whether the first identified acceptable proposal is the most secure or most efficient combination of algorithm options in the list among the several combinations in the list. Further, in cases where the number of discrete proposals is large (e.g., greater than 4 discrete proposals), the amount of data transmission for transmitting the discrete proposals can appreciate and be large.

It may be desirable to minimize the amount of data transmission traffic between the originating communication device and the target communication device. It may also be desirable for the target communication device to holistically evaluate select algorithm options having, for example, the most secure strength, rather than simply selecting a discrete proposal as soon as a discrete proposal is acceptable.

The present application describes methods for generating a minimal number of security association proposals for a target communication device to evaluate while allowing the target communication device to identify the most secure algorithm options identified in said security association proposals for establishing a secure communication channel. As will be apparent in the description herein, each of the one or more security association proposals can represent multiple combinations of algorithm options such that the target communication device can "pick and choose" acceptable algorithm options from each of the option categories.

In particular, the operations described herein include receiving, at an originating communication device, selections in each of the one or more option categories. For each respective option category, the operations include generating a sorted list of algorithm options based on the received selections. The originating communication device can generate a security association proposal that includes each of the respective option categories, where algorithm options in each of the respective option categories can be in order of security strength. Once the security association proposal is transmitted to the target communication device, the target communication device can determine the most secure algorithm option from each of the option categories that the target communication device can support. Accordingly, the example methods and systems described below can minimize the amount of data transmission traffic among the communication devices that otherwise would be required to transmit each possible combination of algorithm settings from each of the respective option categories. Further, the example methods and systems described below can facilitate holistic evaluation of algorithm options for use when establishing a secure communication channel, thereby ameliorating restrictions stemming from evaluating only discrete security association proposals. The examples described below can be applicable to methods and systems using the internet key exchange version 2 (IKEv2) protocol. Furthermore, it can be appreciated that the methods and systems described herein can also be applicable to other internet security protocol implementations.

Reference is made to FIG. 1, which illustrates, in block diagram form, a system 100 for establishing a secure communication channel between an originating communication device 110 and a target communication device 160, in accordance with an example of the present application. The system 100 can also include an administrator device 130. The administrator device 130 can be configured to manage the originating communication device 110 or the target communication device 160. In FIG. 1, two communication devices and an administrator device are illustrated; however, any number of communication devices or administrator devices may be contemplated and any two communication devices may be configured to establish a secure communication channel for exchanging data. Further, in examples described herein, the originating communication device 110 can conduct operations for initiating negotiation among the communication devices for establishing a secure communication channel. However, it can be appreciated that the target communication device 160 can also perform operations described herein for establishing a secure communication channel with other communication devices.

The system 100 includes a network 150. The originating communication device 110 and the target communication device 160 can be configured to communicate with each other over the network 150. Further, the administrator device 130 can communicate with any communication device over the network 150 or with any other similar computing device. The network 150 can include a plurality of interconnected wired and wireless networks, including the Internet, local area networks, wide area networks, or the like.

The originating communication device 110 can establish a secure communication channel for exchanging data over the network 150 with the target communication device 160. The secure communication channel can be defined by algorithm options. The algorithm options can be associated with one of one or more option categories. For example, option categories can include DH groups, encryption algorithms, integrity algorithms, or pseudorandom functions.

The respective option categories can include one or more selectable algorithm options. For example, DH groups can include DH group numbers 20, 19, 15, 14, or 0. Encryption and integrity algorithms can include selectable algorithm options that may be AEAD algorithms or non-AEAD algorithms. Pseudorandom functions can include HMAC-SHA algorithms. Other selectable algorithm options for establishing a secure communication channel are contemplated and the algorithm options described herein are provided as examples only.

The originating communication device 110 includes one or more processors, memory, and a communications module for providing communications capability with other computing devices. The memory can store processor-executable instructions that, when executed, cause a processor to perform operations described herein. In the example originating communication device 110 described herein, the memory can store a secure communication application 112 having processor-executable instructions for conducting the operations described herein. For example, the secure communication application 112 can be a virtual private network (VPN) client application.

The originating communication device 110 includes an input/output module 114. In some examples, the input/output module 114 can include a touch screen display for displaying a user interface and a touch screen interface for receiving motion or touch input from a communication device user. Other examples of the input/output module 114 for displaying content for the communication device user and receiving input signals representing commands or selectable options from the communication device user are contemplated.

In the example illustrated in FIG. 1, the originating communication device 110 may be configured to establish a secure communication channel for transmitting data to and receiving data from the target communication device 160. Thus, the originating communication device 110 may initiate a negotiation process with the target communication device 160 for determining what algorithm options to use for transmitting and receiving data. If algorithm options in any one of the option categories is not supported by the target communication device 160, the negotiation will not be successful and the secure communication channel will not be established. For example, if the originating communication device 110 proposes to utilize an AEAD algorithm for both encryption and integrity checking and if the target communication device 160 does not support AEAD algorithms, the originating communication device 110 would not be able to establish a secure communication channel with the target communication device 160.

The administrator device 130 can be configured to manage communication devices. For example, the administrator device 130 may include an administrator application 132. The administrator application 132 can include processor executable instructions for transmitting, to the originating communication device 110, a signal representing a permitted set of selectable algorithm options. The permitted set of selectable algorithm options can be a subset of a global set of available algorithm options. The permitted set of selectable algorithm options may be displayed by the originating communication device 110 to the first communication device user. For instance, the permitted set of selectable algorithm options can represent the subset of algorithm options that satisfy a minimum security strength threshold that the administrator device 130 mandates for the originating communication device 110. In other examples, the administrator device 130 can determine the permitted set of selectable algorithm options for the originating communication device 110 based on other requirements or factors.

The administrator device 130 can also include data records 134. The data records 134 can be stored in memory on the administrator device 130. The data records 134 can include data associated with respective communication devices that are managed by the administrator device 130. For example, the administrator device 130 may include a data record associated with the originating communication device 110. In one example, the data record can identify the user of the originating communication device 110 to be a technical architect of a technology company. The user of the first communication device 110 may routinely transmit, via electronic mail, trade secrets of the company. Accordingly, the data record associated with the originating communication device 110 may include instructions requiring that the permitted set of selectable algorithms for the originating communication device 110 include encryption and integrity algorithms having a key length equal to or greater than 256 bits. In some examples, the administrator device 130 can transmit a signal to the first communication device 110 indicating that at least some algorithm options on a user interface, as described herein, are to be preselected as selected algorithm options. In some examples, the signal to the first communication device 110 can indicate that at least some of the preselected algorithm options may not be deselected. That is, in the foregoing scenario of the technical architect user, at least some algorithm options may not be deselected (e.g., are mandatory). Other criteria for identifying the permitted set of selectable algorithm options for a particular communication device are contemplated.

It can be appreciated that the target communication device 160 can be similar to the originating communication device 110 and that the target communication device 160 can perform the example operations described herein for establishing a secure communication channel with the originating communication device 110.

Figure 2:
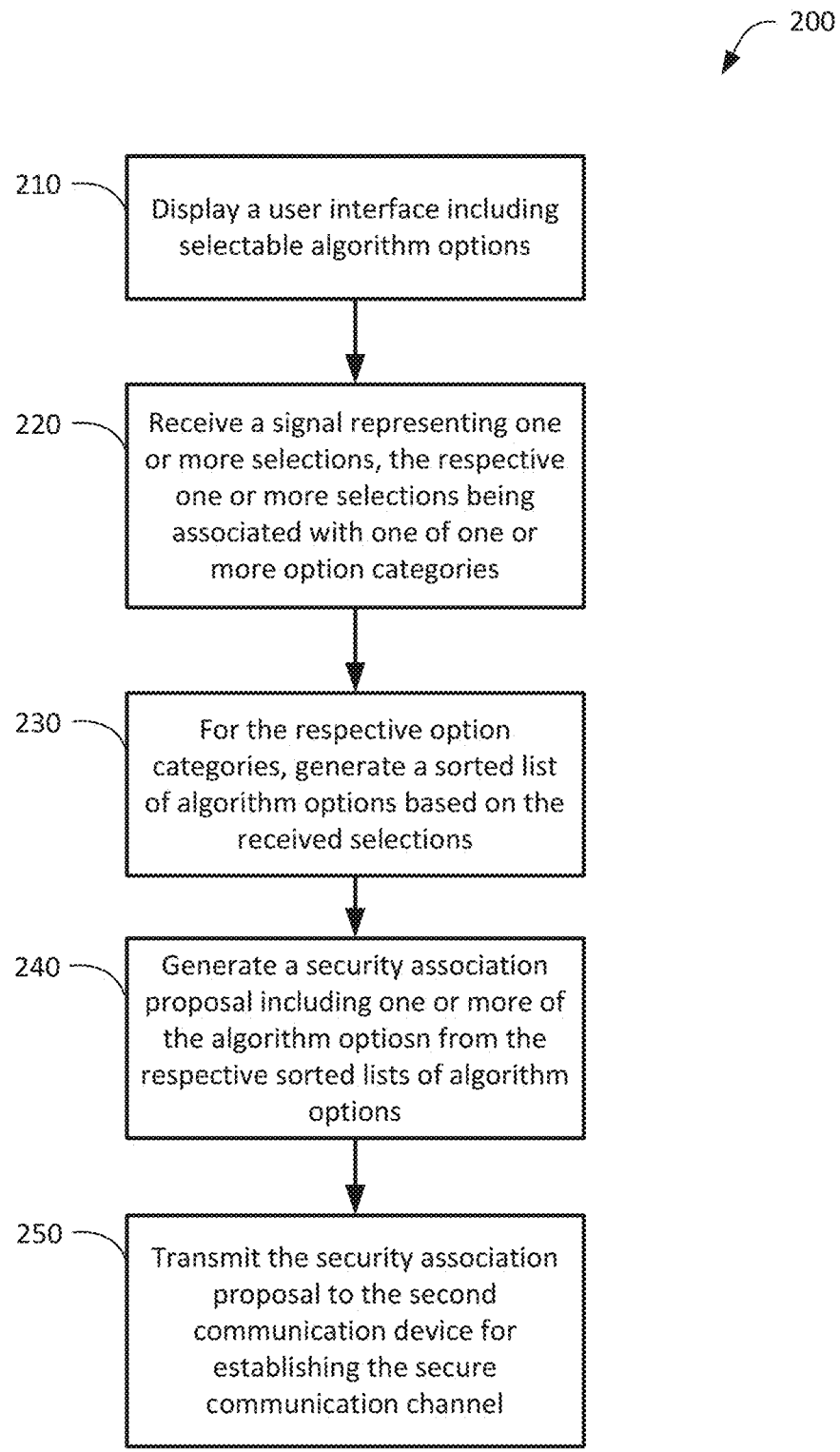
FIG. 2 illustrates, in flowchart form, a method of establishing a secure communication channel between the originating communication device and the target communication device of FIG. 1.

Reference is made to FIG. 2, which illustrates, in flowchart form, a method 200 of establishing a secure communication channel between the originating communication device 110 (FIG. 1) and the target communication device 160 (FIG. 1), in accordance with an example of the present application. The method 200 includes operations that may be carried out by one or more processors of the originating communication device 110. For example, the method 200 can be implemented, at least in part, through processor-executable instructions associated with the secure communication application 112 (FIG. 1). In some examples, one or more of the operations may be implemented via processor-executable instructions in other applications or in an operating system stored and executed on the originating communication device 110. As will be described, the originating communication device 110 includes an input/output module 114 (FIG. 1) that can includes a display for displaying a user interface and an input module for receiving selections.

At operation 210, the originating communication device 110 displays, on a display, a user interface including selectable algorithm options. In some examples, the user interface can include a listing of the possible algorithm options available for establishing a secure communication channel. In some examples, the listing of possible algorithm options can be grouped according to option category. That is, DH group options can be grouped in one area of the user interface, encryption algorithm options can be grouped in another area of the user interface, integrity algorithm options can be grouped in yet a further area of the user interface, and pseudorandom function options can be grouped in some other area of the user interface. The originating communication device 110 can provide user interface elements, such as check boxes, push buttons, or the like, for a user to select desired algorithm options. Other user interface implementations can be contemplated.

At operation 220, the originating communication device 110 receives, via an input module, a signal representing one or more selections of algorithm options. For example, if the input/output module 114 is a touchscreen display and the user interface includes one or more check boxes next to available algorithm options, the originating communication device 110 can receive touch screen input of algorithm option selections when a user selects check boxes associated with desired algorithm options.

In some examples, the respective one or more selections can be associated with one of the one or more option categories. For example, an AES-GCM-128 algorithm option can be associated with both an encryption algorithm category and an integrity algorithm category. In another example, a displayed HMAC-SHA-512-256 algorithm option can be associated with an integrity algorithm category. Table 1 (below) illustrates example option categories and example algorithm options associated with one of the one or more option categories.

TABLE 1

Example Option Categories and Algorithm Options

| Option Category | Algorithm Option |
|---|---|
| DH Groups | 20 |
|  | 19 |
|  | 15 |
|  | 14 |
|  | none |
| Encryption Algorithms | AES-GCM-256 |
|  | AES-GCM-128 |
|  | AES-CBC-256 |
|  | AES-CBC-128 |
|  | Poly1305-Chacha20 |
|  | No encryption |
| Integrity Algorithms | AES-GCM-256 |
|  | AES-GCM-128 |
|  | HMAC-SHA-512-256 |
|  | HMAC-SHA-384-192 |
|  | HMAC-SHA-256-128 |
|  | HMAC-SHA-1-96 |
| Pseudorandom Functions | HMAC-SHA-512 |
|  | HMAC-SHA-384 |
|  | HMAC-SHA-256 |
|  | HMAC-SHA-1 |

In some examples, the originating communication device 110 can provide a user interface with default algorithm option selections. For instance, the originating communication device 110 may provide the user interface with the AES-GCM algorithm options selected (e.g., checkboxes associated with the array of AES-GCM algorithms selected). In some examples, the default selections of algorithm options may be associated with a minimum security strength that the originating communication device 110 is mandated to operate at.

In some examples, the above described default algorithm option selections can be based on options that are supported by the originating communication device 110. For example, the originating communication device 110 can determine whether the originating communication device 110 can compute keys of 256 bit length. Thus, at operation 210, the displayed user interface may include a supported set of selectable algorithm options and may not include algorithm options not within said supported set. In an alternative example, algorithm options not within said supported set may be displayed but may not be selectable. In some examples, the received one or more selections (e.g., operation 220) can be a subset of the supported set of selectable algorithm options.

In some examples, the above described default algorithm option selections can be based on options that are mandated by the administrator device 130. In some examples, the default algorithm options may be non-deselectable. That is, the user of the originating communication device 110 may not be able to deselect one or more algorithm options based on rules provided by the administrator device 130. For instance, the administrator device 130 may require that operations for establishing and communicating over the secure communication channel utilize the HMAC-SHA-512 pseudorandom function. Further, the user of the originating communication device 110 may be able to make at least one selection of one or more non-default algorithm options. That is, for the algorithm options that are not default algorithm options, the originating communication device 110 may receive, via an input module, a signal representing one or more selections from a list of non-default algorithm options.

In some examples, the originating communication device 110 can receive, from the administrator device 130, a signal representing a permitted set of selectable algorithm options. The permitted set of selectable algorithm options can be a subset of a global set of available algorithm options. Thus, in response to receiving the signal representing a permitted set of selectable algorithm options, the originating communication device 110 may display a user interface including algorithm options adhering to a minimum security standard defined by the administrator device 130. In some examples, the received one or more selections (e.g., operation 220) can be a subset of the permitted set of selectable algorithm options.

At operation 230, for the respective option categories, the originating communication device 110 can generate a sorted list of algorithm options based on the received selections. In some examples, the originating communication device 110 can sort algorithm options in order of security strength.

To illustrate, the originating communication device 110 may have received a signal representing selection of algorithm options outlined in Table 2 (below). The originating communication device 110 can generate a sorted list in order of decreasing (or increasing) security strength. In some examples, security strength ordering can be determined based on the number of security key bits or the number of information bits associated with encryption/integrity algorithms. In some other examples, security strength ordering can be determined based on rules stored at the originating communication device 110. For instance, DH group numbers can be ordered in descending order or other rules-based order. Although Table 2 illustrates some examples where selected algorithm options are sorted in order of decreasing security strength, other criteria for generating the sorted list of algorithm options can be contemplated.

TABLE 2

Example of Received Selection of Algorithm Options

|  | Received Selection of Algorithm Options | Sorted List of Security Options |
|---|---|---|
| DH Groups | 14 | 20 |
|  | 20 | 15 |
|  | 15 | 14 |
| Encryption Algorithms | AES-CBC-128 | AES-GCM-256/AES-CBC-256 |
|  | AES-CBC-256 | AES-GCM-128/AES-CBC-128 |
|  | AES-GCM-128 |  |
|  | AES-GCM-256 |  |
| Integrity Algorithms | HMAC-SHA-1-96 | HMAC-SHA-512-256 |
|  | HMAC-SHA-256-128 | HMAC-SHA-384-192 |
|  | HMAC-SHA-384-192 | HMAC-SHA-256-128 |
|  | HMAC-SHA-512-256 | HMAC-SHA-1-96 |
|  | AES-GCM-128 |  |
|  | AES-GCM-256 |  |
| Pseudorandom Functions | HMAC-SHA-1 | HMAC-SHA-512 |
|  | HMAC-SHA-256 | HMAC-SHA-384 |

TABLE 2-continued

Example of Received Selection of Algorithm Options

| Received Selection of Algorithm Options | Sorted List of Security Options |
|---|---|
| HMAC-SHA-384 | HMAC-SHA-256 |
| HMAC-SHA-512 | HMAC-SHA-1 |

As illustrated in the example of Table 2, the originating communication device 110 can sort the DH group numbers according to a descending numerical order; however, it can be appreciated that other methods of sorting DH numbers are contemplated. The originating communication device 110 can sort the selected encryption algorithms from most secure to least secure (e.g., an encryption algorithm using keys having key length of 256 may be more secure than an encryption algorithm using keys having key length of 128). The originating communication device 110 can sort the selected integrity algorithms from most secure to least secure. Further, the originating communication device 110 can sort the selected pseudorandom functions from most secure to least secure.

At operation 240, the originating communication device 110 can generate one or more security association proposals that include one or more of the algorithm options from each of the respective sorted lists of algorithm options. That is, an example security association proposal can include at least one algorithm option chosen from each of the option categories. The security association proposals are generated based on an order in the sorted list of algorithms. For example, the sorted list of algorithms may be in order of security strength.

Continuing with the above described example of Table 2, the originating communication device 110 can generate two proposals, illustrated in Table 3 (below).

TABLE 3

Example Security Association Proposals

| Proposal 1 | Proposal 2 |
|---|---|
| DH group 20 | DH group 20 |
| DH group 19 | DH group 19 |
| DH group 15 | DH group 15 |
| DH group 14 | DH group 14 |
| AES-GCM encryption, key length 256 | AES-CBC encryption, key length 256 |
| AES-GCM encryption, key length 128 | AES-CBC encryption, key length 128 |
| Pseudorandom Function HMAC-SHA-512 | Integrity HMAC-SHA-512-256 |
| Pseudorandom Function HMAC-SHA-384 | Integrity HMAC-SHA-384-192 |
| Pseudorandom Function HMAC-SHA-256 | Integrity HMAC-SHA-256-128 |
| Pseudorandom Function HMAC-SHA-1 | Integrity HMAC-SHA-1-96 |
| | Pseudorandom Function HMAC-SHA-512 |
| | Pseudorandom Function HMAC-SHA-384 |
| | Pseudorandom Function HMAC-SHA-256 |
| | Pseudorandom Function HMAC-SHA-1 |

In the example of Table 3, the originating communication device 110 generates a minimum number of security association proposals that include a combination of algorithm options that are compatible and that are representative of at least one algorithm option from each of the option categories. The one or more security association proposals are generated based on an order in the sorted list. For example, as illustrated in Table 3, each of the respective option categories are sorted in order of decreasing security strength. It can be appreciated that because the respective security association proposals include the order in the associated sorted list, the target communication device 160 can identify algorithm option characteristics (e.g., security strength) without having to traverse the entire list of algorithm options to identify, for example, the most secure security strength option.

In the example of Table 3, two proposals are provided, where each proposal includes algorithm options that can be compatible with one another. Further, in the above described example associated with Table 3, a minimum of two proposals are provided at least because AEAD algorithm options cannot be combined into a security association proposal with non-AEAD algorithm options. The originating communication device 110 generates a first proposal that includes a sorted list of AEAD encryption algorithm selections (e.g., AES-GCM encryption with key lengths 256 and 128). It can be appreciated that when an AEAD encryption algorithm selection is made, an integrity algorithm selection may not be required.

Further, because non-AEAD integrity algorithms (e.g., HMAC-SHA family algorithm options) may be incompatible with AEAD algorithms, the non-AEAD integrity algorithms are included in a second proposal. In the example illustrated in Table 3, the first proposal includes AEAD algorithm option selections (e.g., AES-GCM family algorithm options) to the exclusion of non-AEAD integrity algorithms. Further, the second proposal includes the non-AEAD integrity algorithms to the exclusion of AEAD algorithms. Accordingly, the originating communication device 110 can determine whether algorithm option selections in one option category are compatible/operable with algorithm option selections in another option category. Thus, the originating communication device 110 can generate a minimum number of proposals needed for including each selected algorithm option in at least one security association proposal. In the foregoing examples, the originating communication device 110 generates a minimal number of proposals and does not generate a plurality of discrete proposals for representing all permutations/combinations of algorithm options. Accordingly, the originating communication device 110 provides compact proposals when negotiating establishment of a secure communication channel with the target communication device 160.

It can be appreciated that if, at operation 220, the originating communication device 110 receives a signal representing selections that only include AEAD algorithm options, then the originating communication device 110 can generate a single security association proposal for including algorithm options from each of the option categories.

At operation 250, the originating communication device 110 can transmit the one or more security association proposals to the target communication device 160 for establishing the secure communication channel via the network 150.

Further, the originating communication device 110 can receive a signal from the target communication device 160 indicating that one of the one or more security association proposals is selected. In response to receiving this signal from the target communication device 160, the originating communication device 110 can establish the secure communication with the target communication device 160 for transmitting data to and receiving data from that target communication device 160.

For example, the originating communication device 110 can receive a signal from the target communication device 160 indicating that each of the highest security strength algorithm options from each of the respective option categories or that each of the highest ranked algorithm option in the sorted list of security options is supported by the target communication device (e.g., one algorithm option from each option category). The originating communication device 110 can prepare data for transmission based on the highest security strength algorithm options that are supported by the target communication device 160 and, subsequently, transmit the prepared data to the target communication device 160 over the established secure communication channel. For example, preparing data for transmission can include identifying keys associated with a DH group number and encrypting data using the encryption algorithm identified in the security association proposal. Further, preparing data for transmission can also include appending digital signatures or the like according to the integrity algorithm identified in the security association proposal or utilizing the identified pseudorandom function for operations described herein.

In some examples, the originating communication device 110 can dynamically update the user interface for displaying selectable algorithm options. For example, once a user interface is displayed at the originating communication device 110 (e.g., operation 210, FIG. 2), the originating communication device 110 can determine that an AEAD algorithm (e.g., AES-GCM encryption algorithm) is selected from the user interface (e.g., operation 220, FIG. 2) and, in response, can restrict the security association proposal generation from including non-AEAD integrity algorithms (e.g., HMAC-SHA family algorithms). That is, non-AEAD integrity algorithms may no longer be available for selection via the displayed user interface.

In another example, once a user interface including selectable algorithm options is displayed at the originating communication device 110, the originating communication device 110 can determine that one or more algorithm option selections is a non-AEAD integrity algorithm and, in response can automatically select one or more non-AEAD encryption algorithms from a global set of available algorithm options. In some examples, non-AEAD encryption algorithms include AES-CBC family of encryption algorithms.

Figure 3:
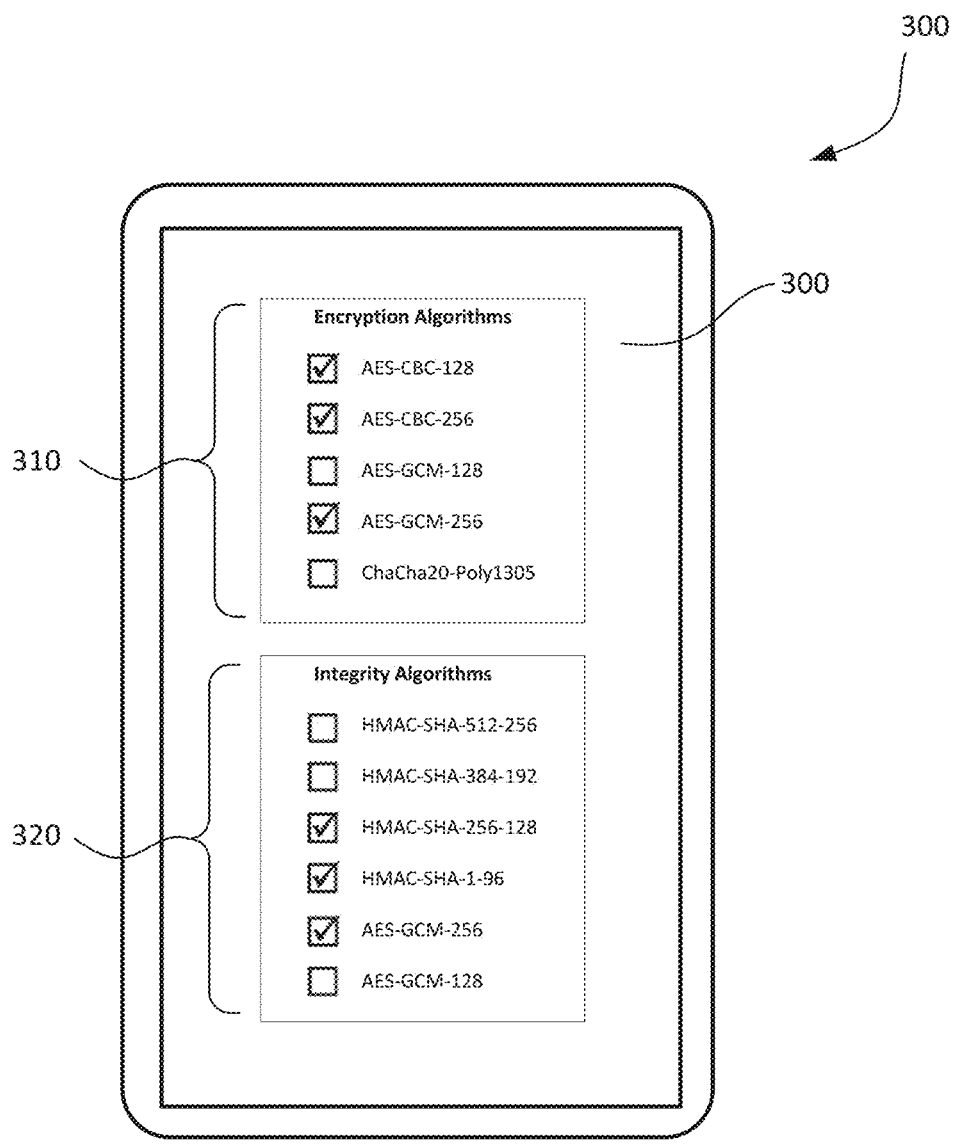
FIG. 3 diagrammatically illustrates a user interface including selectable algorithm options, in accordance with an example of the present application.

Reference is now made to FIG. 3, which diagrammatically illustrates a user interface 300 including selectable algorithm options, in accordance with an example of the present application. The user interface 300 may be provided by the secure communication application 112 (FIG. 1) executing on the originating communication device 110 (FIG. 1). In the present example, user interface 300 is for receiving user selection of one or more encryption algorithms 310 and one or more integrity algorithms 320. The user selections may be made via check box input. In other examples, other input mechanisms, such as icons, etc., are contemplated. For example, the originating communication device 110 may, at operation 210, display the user interface 300 including the selectable encryption algorithms 310 and the selectable one or more integrity algorithms 320. Subsequently, the originating communication device 110 may, at operation 220, receive user input via the check boxes for indicating selection of required encryption algorithms or integrity algorithms. It can be appreciated that the user interface 300 illustrates encryption algorithms 310 and integrity algorithms 320; however, other algorithm options can additionally be displayed.

To illustrate some of the foregoing examples, in the user interface 300 of FIG. 3, the user of the originating communication device 110 can select the AES-GCM-256 algorithm option under the "Encryption Algorithms" category. In response, the originating communication device 110 can automatically select the AES-GCM-256 algorithm option under the "Integrity Algorithms". It can be appreciated that the visual selection of the algorithm option under the "Integrity Algorithms" category is illustrative to the device user, as the AES-GCM-256 protocol may not necessarily require an integrity algorithm option to be selected once the corresponding encryption algorithm option is selected.

Further, in the user interface 300 of FIG. 3, the user of the originating communication device 110 can select both AEAD algorithm options (e.g., AES-GCM-256) and non-AEAD algorithm options (e.g., AES-CB C-256 or AES-CBC-128). In examples described herein, when both AEAD algorithm options and non-AEAD algorithm options are selected, the originating communication device 110 can generate two or more security association proposals, as it can be inoperable to include an AEAD encryption algorithm option with a non-AEAD integrity algorithm option within the same security association proposal. Accordingly, in the present example, the originating communication device 110 can generate two or more security association proposals.

Figure 4:
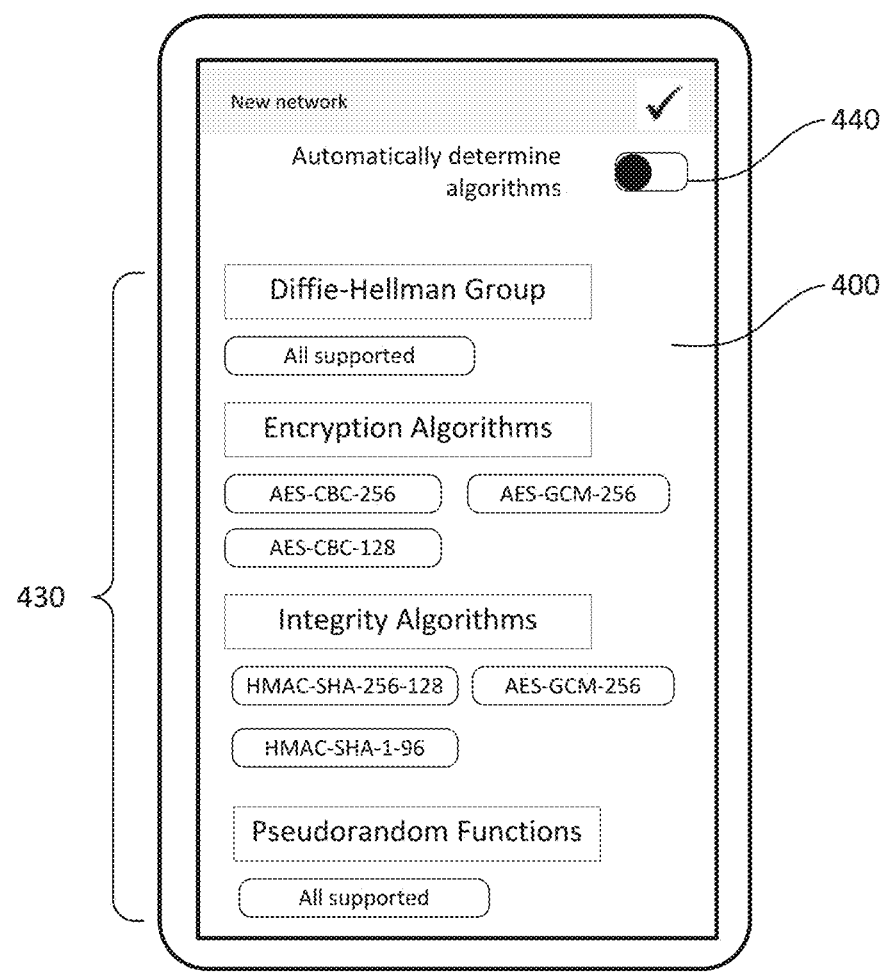
FIG. 4 diagrammatically illustrates a user interface, in accordance with another example of the present application.

Reference is now made to FIG. 4, which diagrammatically illustrates a user interface 400, in accordance with an example of the present application. The originating communication device 110 (FIG. 1) can generate the user interface 400 subsequent to receiving a signal representing one or more selections via the input module. For example, the originating communication device 110 can generate the user interface 400 in FIG. 4 upon receiving a signal representing one or more algorithm option selections. The originating communication device 110 can generate the user interface 400 of FIG. 4 for summarizing algorithm option selections 430 that correspond to selections received from a user that provided input using the user interface 300 in FIG. 3.

Further, in some examples, the user interface 400 can include a toggle input interface 440 for receiving instructions to generate a security association proposal (e.g., operation 240 of FIG. 2). For example, when the toggle input interface 440 is set to an "on" position, the originating communication device 110 may generate one or more security association proposals as if all algorithm options are selected. That is, when the toggle input interface 440 is set to an "on" position, the originating communication device 110 can generate the one or more security association proposals as if every encryption algorithm 310 (FIG. 3) is selected and as if every integrity algorithm 320 (FIG. 3) is selected. A user of the originating communication device can set the toggle input interface 440 in the "on" position when the user is not concerned with utilizing specific algorithms for establishing a secure communication channel with a target communication device 160 (FIG. 1). In some examples, the "on" position may be known as a "compatible" mode, as the "compatible" mode can increase chances that one or more security association proposals transmitted to the target communication device 160 will be supported or accepted by the target communication device 160.

When the toggle input interface 440 is set to an "off" position, the originating communication device 110 can generate a security association proposal according to one or more methods described herein. That is, when the toggle input interface 440 is set to an "off" position, the originating communication device 110 identifies which specific algorithm options to incorporate in a security association proposal based on the user selection options, such as the algorithm option selections 430 shown in FIG. 4.

In the examples described herein, the originating communication device 110 can generate a security association proposal having a plurality of sorted lists of algorithm options (e.g., sorted in order of security strength measurement), where each sorted list is associated with an option category (e.g., DH group number, encryption algorithm, etc.). The originating communication device 110 can transmit the generated security association proposal to the target communication device 160. Subsequently, the target communication device 160 can identify or choose an algorithm option that the target communication device 160 can support from each of the option categories. Thus, a secure communication channel can be established between the originating communication device 110 and the target communication device 160. That is, the target communication device 160 can identify algorithm options from a single round of proposal generation. In addition, the target communication device 160 can efficiently identify, based on a sorted list of algorithm options for each of the option categories, algorithm options having the greatest supported security strength or based on other rules-based criteria. That is, if the highest security strength option is not supported at the target communication device 160, the target communication device 160 can select a next lower security strength option in the sorted list of algorithm options for that option category. It can be appreciated that if the target communication device 160 cannot support any of the algorithm option selections from the originating communication device 110, the target communication device 160 can identify, shortly after the security association proposal(s) is/are provided, that a secure communication channel cannot be established between the respective communication devices.

Figure 5:
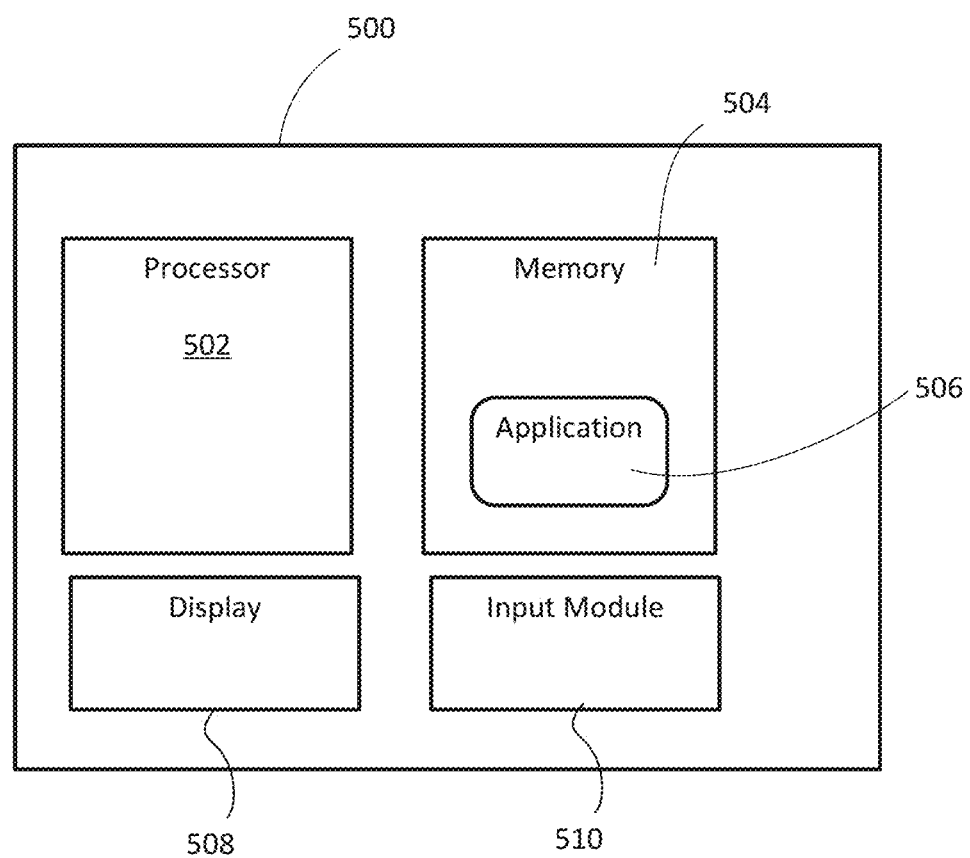
FIG. 5 illustrates, in simplified block diagram form, an electronic device, in accordance with an example of the present application.

Reference is made to FIG. 5, which illustrates, in simplified block diagram form, an electronic device 500, in accordance with an example of the present application. The electronic device 500 can be the originating communication device 110 (FIG. 1), the target communication device 160 (FIG. 1), or the administrator device 130 (FIG. 1).

The electronic device 500 includes one or more processors 502, memory 504, and a communications module for providing network communication capabilities with other computing devices. The memory 504 can store processor-executable software applications 506 that include an operating system to provide basic device functions. The software applications 506 may also contain instructions implementing the operations and functions of the methods described herein. For example, in the case of the originating communication device 110, the software applications 506 can include the secure communication application 112 (FIG. 1) or example operations illustrated with reference to the method 200 of FIG. 2.

The electronic device 500 includes a display interface and/or a display 508. The display 508 can be any suitable display, such as a liquid crystal display (LCD), an e-ink/e-paper display, or the like. In some examples, the display 508 is a touchscreen display.

The electronic device 500 includes an input module 510 for receiving signals representing commands or selections consistent with the examples described herein. For example, the electronic device 500 can receive, via the input module 510, a signal representing one or more selections, where the respective one or more selections are associated with one of the one or more option categories, as described herein. In some examples, the input module 510 can be a touch input interface module of a touchscreen display, a push button input, a pointing device input, or other like device. In some examples, the combination of the display 508 and the input module 510 corresponds to the input/output module 114 of FIG. 1.

In some examples, the electronic device 500 is a portable electronic device, such as a smartphone, a personal computer, a personal digital assistant, a portable navigation device, a mobile phone, a wearable computing device (e.g., smart watch, wearable activity monitor, or the like), or any other type of computing device that may be configured to store data and software instructions, and execute software instructions to perform example operations described herein.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A secure communication method comprising:
receiving, by one or more processors of a first communication device, a first signal indicating a plurality of algorithm options selected by a user of the first communication device;
generating, by the one or more processors, one or more security association proposals based on the plurality of algorithm options indicated by the first signal;
transmitting, by the one or more processors, the one or more security association proposals to a second communication device;
receiving, by the one or more processors, from the second communication device, a second signal indicating that one of the one or more security association proposals has been selected; and
establishing, by the one or more processors, a secure communication channel between the first communication device and the second communication device.

2. The secure communication method of claim 1, further comprising:

generating, by the one or more processors, one or more sorted lists of algorithm options based on the first signal.

3. The secure communication method of claim 2, wherein the one or more sorted lists of algorithm options are sorted in order of decreasing or increasing security strength.

4. The secure communication method of claim 2, wherein the one or more sorted lists of algorithm options are sorted in a rules-based order.

5. The secure communication method of claim 2, wherein one of the one or more sorted lists of algorithm options includes one or more Diffie-Hellman (DH) groups, one or more encryption algorithms, one or more integrity algorithms, and one or more pseudorandom function algorithms.

6. The secure communication method of claim 1, wherein the algorithm options include Diffie-Hellman (DH) groups.

7. The secure communication method of claim 1, wherein the algorithm options include encryption algorithms.

8. The secure communication method of claim 1, wherein the algorithm options include integrity algorithms.

9. The secure communication method of claim 1, wherein the algorithm options include pseudorandom function algorithms.

10. A first communication device comprising:
a memory configured to store processor-executable instructions for establishing a secure communication channel between the first communication device and a second communication device; and
one or more processors operably coupled with the memory, the one or more processors being configured to:
receive a first signal indicating a plurality of algorithm options selected by a user of the first communication device;
generate one or more security association proposals based on the plurality of algorithm options indicated by the first signal;
transmit the one or more security association proposals to the second communication device;
receive, from the second communication device, a second signal indicating that one of the one or more security association proposals has been selected; and
establish the secure communication channel between the first communication device and the second communication device.

11. The first communication device of claim 10, wherein the one or more processors are further configured to generate one or more sorted lists of algorithm options based on the first signal.

12. The first communication device of claim 11, wherein the one or more sorted lists of algorithm options are sorted in order of decreasing or increasing security strength.

13. The first communication device of claim 11, wherein one of the one or more sorted lists of algorithm options includes one or more Diffie-Hellman (DH) groups, one or more encryption algorithms, one or more integrity algorithms, and one or more pseudorandom function algorithms.

14. The first communication device of claim 11, wherein the one or more sorted lists of algorithm options are sorted in a rules-based order.

15. The first communication device of claim 10, wherein the algorithm options include Diffie-Hellman (DH) groups.

16. The first communication device of claim 10, wherein the algorithm options include encryption algorithms.

17. The first communication device of claim 10, wherein the algorithm options include integrity algorithms.

18. The first communication device of claim 10, wherein the algorithm options include pseudorandom function algorithms.

19. A non-transitory computer-readable storage medium storing instructions for establishing a secure communication channel between a first communication device and a second communication device, wherein the instructions, when executed by a processor of a computer system, cause the computer system to:
receive a first signal indicating a plurality of algorithm options selected by a user of the first communication device;
generate one or more security association proposals based on the plurality of algorithm options indicated by the first signal;
transmit the one or more security association proposals to the second communication device;
receive, from the second communication device, a second signal indicating that one of the one or more security association proposals has been selected; and
establish the secure communication channel between the first communication device and the second communication device.

20. The non-transitory computer-readable storage medium of claim 19, wherein the instructions further cause the computer system to generate one or more sorted lists of algorithm options based on the first signal, wherein the one or more sorted lists of algorithm options are sorted in order of decreasing or increasing security strength.

* * * * *